(12) United States Patent
Moriya et al.

(10) Patent No.: US 11,541,896 B2
(45) Date of Patent: Jan. 3, 2023

(54) VEHICLE CONTROL APPARATUS

(71) Applicant: SUBARU CORPORATION, Tokyo (JP)

(72) Inventors: Fumiyuki Moriya, Tokyo (JP); Hirofumi Yabe, Tokyo (JP); Atsuhi Doki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/407,619

(22) Filed: Aug. 20, 2021

(65) Prior Publication Data

US 2022/0063633 A1 Mar. 3, 2022

(30) Foreign Application Priority Data

Sep. 3, 2020 (JP) .............................. JP2020-148157

(51) Int. Cl.
*H04N 5/44* (2011.01)
*B60W 40/08* (2012.01)
(Continued)

(52) U.S. Cl.
CPC .......... *B60W 40/08* (2013.01); *B60W 10/182* (2013.01); *B60W 50/14* (2013.01); *G06F 3/165* (2013.01); *B60W 2040/0818* (2013.01); *B60W 2050/143* (2013.01); *B60W 2540/227* (2020.02); *B60W 2540/26* (2013.01)

(58) Field of Classification Search
CPC .... B60W 40/08; B60W 10/182; B60W 50/14; B60W 2040/0818; B60W 2050/143; B60W 2540/227; B60W 2540/26; B60W 2710/18; G06F 3/165; G06F 3/167
See application file for complete search history.

(56) References Cited

U.S. PATENT DOCUMENTS 3,947,815 A * 3/1976 Muncheryan .......... B60Q 1/503
340/576
5,090,514 A * 2/1992 Wright ................... B60K 28/06
180/325

(Continued)

FOREIGN PATENT DOCUMENTS

JP 2017-144808 A 8/2017

*Primary Examiner* — Munear T Akki
(74) *Attorney, Agent, or Firm* — Troutman Pepper Hamilton Sanders LLP

(57) ABSTRACT

A vehicle control apparatus to be applied to a vehicle includes an abnormality detection unit, a notification control unit, and an automatic stop control unit. The abnormality detection unit detects an abnormal condition of a driver who drives the vehicle while the vehicle is traveling. The notification control unit performs notification control to make a notification of the abnormal condition detected by the abnormality detection unit. The automatic stop control unit starts first vehicle stop control of the vehicle when detecting no operation to cancel the notification control within a predetermined period of time after the notification control unit starts the notification control. The automatic stop control unit starts second vehicle stop control of the vehicle without waiting for an elapse of the predetermined period of time when detecting a vehicle stop request operation performed by a passenger in the vehicle within the predetermined period of time.

17 Claims, 4 Drawing Sheets

(51) Int. Cl.
*B60W 50/14* (2020.01)
*B60W 10/18* (2012.01)
*G06F 3/16* (2006.01)

(56) References Cited

U.S. PATENT DOCUMENTS

| | | | | |
|---|---|---|---|---|
| 5,775,456 | A * | 7/1998 | Reppas | B60K 26/02 |
| | | | | 340/471 |
| 2014/0204193 | A1 * | 7/2014 | Zhang | G06V 40/18 |
| | | | | 348/78 |
| 2017/0232973 | A1 * | 8/2017 | Otake | B60W 50/10 |
| | | | | 701/43 |
| 2017/0345276 | A1 * | 11/2017 | Stoltz | G06V 20/597 |
| 2018/0260640 | A1 * | 9/2018 | Lintz | G06V 20/59 |
| 2020/0148214 | A1 * | 5/2020 | Tamagaki | G06V 20/597 |

\* cited by examiner

VEHICLE CONTROL APPARATUS

CROSS-REFERENCE TO RELATED APPLICATION

The present application claims priority from Japanese Patent Application No. 2020-148157 filed on Sep. 3, 2020 the entire contents of which are hereby incorporated by reference.

BACKGROUND

The technology relates to a vehicle control apparatus for a vehicle configured to perform automated driving control.

A technique is known that stops a vehicle from traveling when an abnormal condition, such as loss of consciousness, of a driver is detected, in order to prevent a subsequent accident.

Japanese Unexamined Patent Application Publication No. 2017-144808 discloses a technique that sounds an alarm when an abnormal condition of the driver is detected. If any operation to cancel the alarm is not performed by the driver within a predetermined period of time, the vehicle is stopped from traveling.

SUMMARY

An aspect of the technology provides a vehicle control apparatus to be applied to a vehicle. The vehicle control apparatus includes an abnormality detection unit, a notification control unit, and an automatic stop control unit. The abnormality detection unit is configured to detect an abnormal condition of a driver who drives the vehicle while the vehicle is traveling. The notification control unit is configured to perform notification control to make a notification of the abnormal condition detected by the abnormality detection unit. The automatic stop control unit is configured to start first vehicle stop control of the vehicle when detecting no operation to cancel the notification control within a predetermined period of time after the notification control unit starts the notification control, and start second vehicle stop control of the vehicle without waiting for an elapse of the predetermined period of time when detecting a vehicle stop request operation performed by a passenger in the vehicle within the predetermined period of time.

An aspect of the technology provides a vehicle control apparatus to be applied to a vehicle. The vehicle control apparatus includes circuitry. The circuitry is configured to detect an abnormal condition of a driver who drives the vehicle while the vehicle is traveling. The circuitry is configured to perform notification control to make a notification of the abnormal condition detected. The circuitry is configured to start first vehicle stop control of the vehicle when detecting no operation to cancel the notification control within a predetermined period of time after starting the notification control. The circuitry is configured to start second vehicle stop control of the vehicle without waiting for an elapse of the predetermined period of time when detecting a vehicle stop request operation performed by a passenger in the vehicle within the predetermined period of time.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
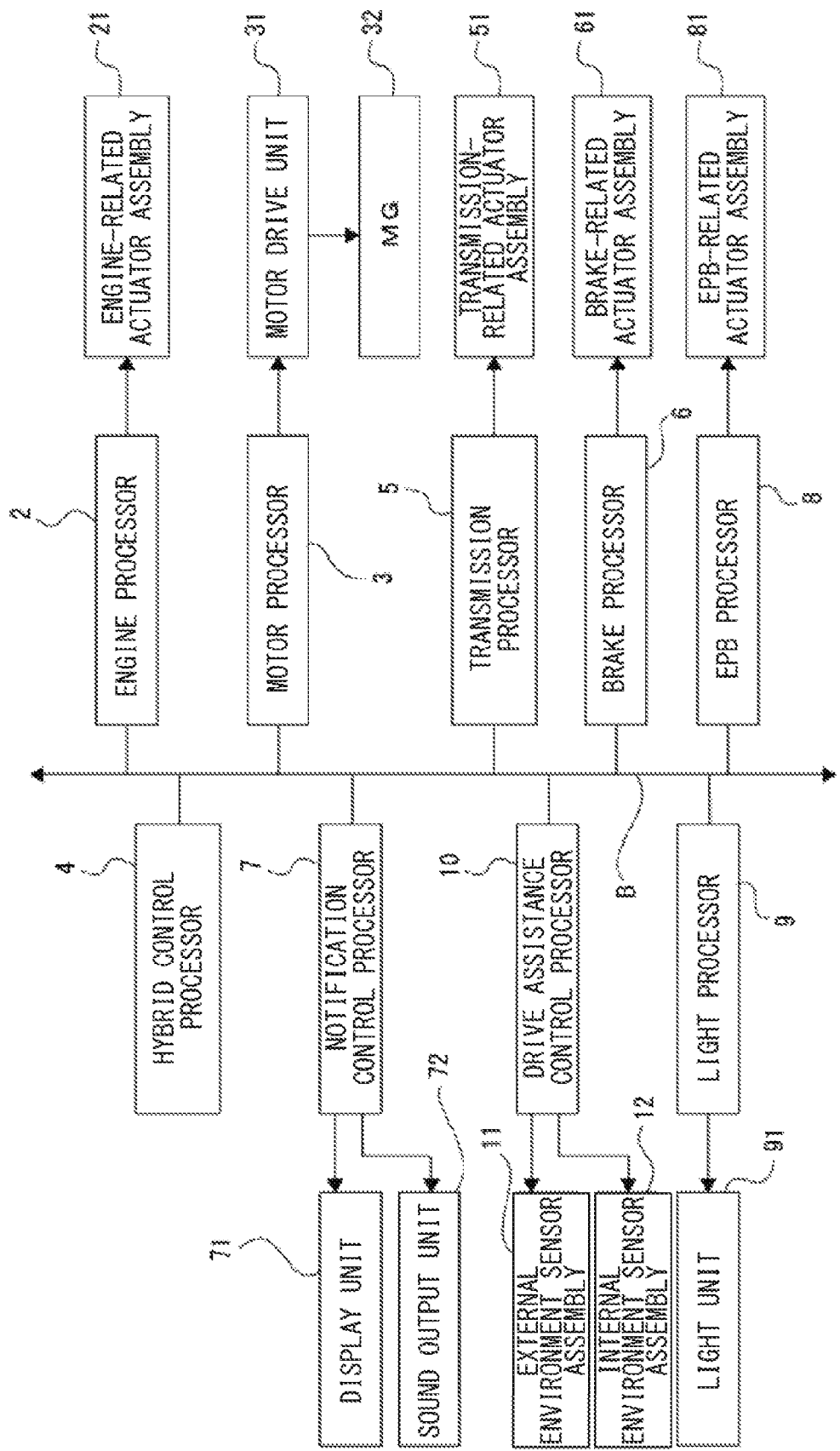
FIG. 1 is a block diagram illustrating an exemplary configuration of a vehicle control apparatus according to one example embodiment of the technology.

Sounding an alarm when an abnormal condition of the driver is detected is an effective way to bring the driver out of the abnormal condition. However, such an alarm can unnecessarily fuel the anxiety of the passenger, making the passenger feel uncomfortable.

It is desirable to provide a vehicle control apparatus that makes it possible to perform appropriate stop control depending on the conditions of a driver while ensuring a passenger to feel comfortable.

Some example embodiment of the technology will now be described with reference to FIGS. 1 to 4. These drawings illustrate only main portions and their peripheries necessary for the following description. The drawings are schematic and are not intended to be drawn to scale. The dimensions, ratios, and so forth of the configurations illustrated in the drawings are mere examples. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. Thus, various modification may be made depending on the design matter without departing from the scope of the technology. Throughout the present specification and the drawings, elements having substantially the same function and configuration are denoted with the same numerals to avoid any redundant description.

A vehicle control apparatus 1 according to an example embodiment of the technology may be mounted in a hybrid electric vehicle including an engine and a motor as drive sources that drive the drive wheels, for example. The vehicle may be provided with a driver seat, a front passenger seat, a rear passenger seat. The vehicle may accommodate a driver and a passenger while traveling.

Although the vehicle control apparatus 1 may be mounted in a hybrid electric vehicle in the present example embodiment, the vehicle control apparatus 1 may be applied to various vehicles. For example, the vehicle control apparatus 1 may be applied to a vehicle including only an engine as a drive source to drive the drive wheels and an electric vehicle including only a motor as a drive source to drive the drive wheels.

The vehicle control apparatus 1 may include an engine processor 2, a motor processor 3, a hybrid control processor 4, a transmission processor 5, a brake processor 6, a notification control processor 7, an electronic parking brake (EPB) processor 8, a light processor 9, and a drive assistance control processor 10. These processors may each include a microcomputer that includes a central processing unit (CPU), a read only memory (ROM), a random access memory (RAM), and so forth. These processors may be coupled to each other with a bus line B so as to communicate with each other.

The engine processor 2 may control various actuators in an engine-related actuator assembly 21 on the basis of detection signals received from a vehicle speed sensor, an engine speed sensor, an accelerator position sensor, a throttle position sensor, and so forth. Examples of the actuators in the engine-related actuator assembly 21 may include a throttle actuator that drives a throttle valve, and an injector that performs fuel injection.

The engine processor 2 may control the engine-related actuator assembly 21 also on the basis of operational data inputted by the driver and a control signal received from the hybrid control processor 4.

The motor processor 3 may control a motor drive unit 31 on the basis of a detection signal received from a predetermined sensor, to control the operation of a motor generator (MG) 32. The motor drive unit 31 may be electric circuitry including a drive circuit for the MG 32.

In a case where the MG 32 needs to perform power running, the motor processor 3 may send the motor drive unit 31 a command about required motor drive force to cause the MG 32 to perform the power running. In a case where the MG 32 needs to perform a regenerative rotation, the motor processor 3 may send the motor drive unit 31 a command about required motor drive force to cause the MG 32 to perform the regenerative rotation.

Further, the motor processor 3 may control the motor drive unit 31 on the basis of operational data inputted by the driver and a control signal received from the hybrid control processor 4.

The hybrid control processor 4 may control traveling of the vehicle by sending a command to the engine processor 2 and the motor processor 3 on the basis of the required torque corresponding to the accelerator operation quantity based on the accelerator position value received from the accelerator position sensor, and the required torque calculated by the drive assistance control processor 10.

The transmission processor 5 may control various actuators in a transmission-related actuator assembly 51 on the basis of detection signals received from predetermined sensors provided in the vehicle. Examples of the actuators in the transmission-related actuator assembly 51 may include a transmission actuator that controls automatic transmission of the vehicle, and a frontward/backward travel changeover actuator that controls the operation of a frontward/backward travel changeover mechanism.

The transmission processor 5 may control the transmission-related actuator assembly 51 also on the basis of operational data inputted with a predetermined operator and a control signal received from the drive assistance control processor 10.

The brake processor 6 may control various actuators in a brake-related actuator assembly 61 on the basis of detection signals received from predetermined sensors and operational data inputted by the driver. Examples of the actuators in the brake-related actuator assembly 61 may include a hydraulic control actuator that controls the hydraulic pressure outputted from a brake booster to a master cylinder and the hydraulic pressure inside a brake fluid pipe.

The brake processor 6 may further perform automatic brake control to stop the vehicle on the basis of a control signal received from the hybrid control processor 4 in order to avoid a contact.

The notification control processor 7 may control the notification of various pieces of vehicle information to the occupants. For example, the notification control processor 7 may control displaying on a display unit 71 and sound output from a sound output unit 72.

Examples of the display unit 71 may include a multifunction display (MFD), various meters including a speed meter or a tachometer provided in a meter panel, and other display devices that notify the driver of information. The notification control processor 7 may cause the display unit 71, which may be an MFD, to display various alarm notifications on the basis of a control signal received from the drive assistance control processor 10, for example.

The notification control processor 7 may further control the output of a sound, such as a navigation sound, from the sound output unit 72. The sound output unit 72 may include a sound signal processing section and a speaker, for example. The notification control processor 7 may control the output of various alarms from the sound output unit 72 on the basis of a control signal received from the drive assistance control processor 10, for example.

The EPB processor 8 may hold the vehicle in a stopped state by driving an EPB-related actuator assembly 81 on the basis of operational data inputted by the driver and a control signal received from the drive assistance control processor 10, for example.

The EPB-related actuator assembly 81 may be driven and controlled by the EPB processor 8. For example, the EPB-related actuator assembly 81 may include an electrically-driven actuator, such as an electric motor. Examples of the actuators in the EPB-related actuator assembly 81 may include an actuator that drives an inner drum (drum-in disc) brake mechanism accommodating a small parking drum brake in a hub.

The light processor 9 may control turning on/off of a light unit 91 on the basis of operational data inputted by the driver or a control signal received from the drive assistance control processor 10. The light unit 91 may collectively indicate various lights mounted on the vehicle, such as a headlight, a backup light, a hazard indicator, a direction indicator, a brake light, and so forth.

An exemplary operational configuration of the drive assistance control processor 10 will now be described with reference to FIG. 2.

The drive assistance control processor 10 may include a travel control unit 10a, an abnormality detection unit 10b, a notification control unit 10c, and an automatic stop control unit 10d.

In the present example embodiment, the drive assistance control processor 10 may be a single processor including these units. Alternatively, some or all of the operations of these units may be performed by another processor.

The travel control unit 10a may perform various traveling control, such as autocruise control or steering assistance control, using a detection value detected by an external environment sensor assembly 11.

The external environment sensor assembly 11 may collectively indicate an imaging device, a global navigation satellite system (GNSS) sensor, and so forth. The imaging device may obtain an image from which objects outside the vehicle, such as a preceding vehicle, a pedestrian, and a lane line, are to be detected or identified. The GNSS sensor may measure the latitude, longitude, altitude of a target object.

The sensor used to detect an object should not be limited to the imaging device. Alternatively, another sensor, such as a millimeter-wave radar, may be used.

The travel control unit 10a may control various processors necessary to control the operations of the accelerator pedal, the brake, and the steering wheels on the basis of the data on the object detected and identified by the imaging device in the external environment sensor assembly 11, for example.

The abnormality detection unit 10b detects an abnormal condition of the driver while the vehicle is traveling. The term "abnormal condition" of the driver may refer to the state in which the driver can find it difficult to drive the vehicle safely. For example, the abnormal condition of the driver may include a state where the driver is unconscious due to a sudden illness or a faint, or a drowsy or inattentive without concentrating on driving.

The abnormality detection unit 10b may detect the abnormal condition of the driver using a driver monitoring system (DMS) including an in-vehicle image sensor, for example. The abnormality detection unit 10b may also determine that the driver is in the abnormal condition when the steering wheel angle detected by a steering wheel angle sensor has been unchanged for a predetermined time, for example. Alternatively, the abnormality detection unit 10b may detect the abnormal condition of the driver on the basis of the pulse rate of the driver, the body temperature of the driver, or external sound information, for example.

The abnormality detection unit 10b may detect the abnormal condition of the driver using a detection value obtained by an internal environment sensor assembly 12, for example. The internal environment sensor assembly 12 may collectively indicate an imaging device, an steering wheel angle sensor, a pulse sensor, a body temperature sensor, an in-vehicle microphone, a seating sensor, and so forth. The imaging device may acquire an image from which a facial expression of the driver, the posture of the driver, and the presence of a passenger are to be detected or identified. The steering wheel angle sensor may detect the angle of the steering wheel to determine an abnormality in a steering operation. The pulse sensor may detect the pulse rate of the driver. The body temperature sensor may detect the body temperature of the driver. The in-vehicle microphone may obtain data on sounds or voices generated by the driver or passenger. The seating sensor may detect the presence of a passenger on each seat by calculating the load on each seat.

The notification control unit 10c performs notification control to make a notification of the abnormality detected by the abnormality detection unit 10b. For example, the notification control unit 10c may perform the notification control by causing the notification control processor 7 to display an alarm message using the display unit 71 and output an alarm using the sound output unit 72.

The automatic stop control unit 10d performs vehicle stop control to stop the vehicle from traveling on the basis of the data on the abnormal condition of the driver detected by the abnormality detection unit 10b and operational data inputted by the passenger. The automatic stop control unit 10d may control processors relevant to the vehicle stop control.

After the control to stop the vehicle, the automatic stop control unit 10d may hold the vehicle in the stopped state by causing the EPB processor 8 to control the driving of the EPB-related actuator assembly 81.

An exemplary flow from the detection of the abnormal condition of a driver to vehicle stop control performed by the vehicle control apparatus 1 according to the present example embodiment will now be schematically described with reference to FIG. 3. In the present example embodiment, a driver and a passenger may be riding on the traveling vehicle.

While the vehicle is traveling, the vehicle control apparatus 1 may detect an abnormal condition of the driver on the basis of the data detected by the internal environment sensor assembly 12, for example. In FIG. 3, the abnormal condition of the driver may be detected at time t1.

When detecting the abnormal condition of the driver at the time t1, the vehicle control apparatus 1 may start notification control (hereinafter referred to as abnormality notification control) that notifies the passenger of the detection of the abnormal condition of the driver by causing the sound output unit 72 to output an alarm. The method of determining the abnormal condition of the driver will be described later.

Figure 3:
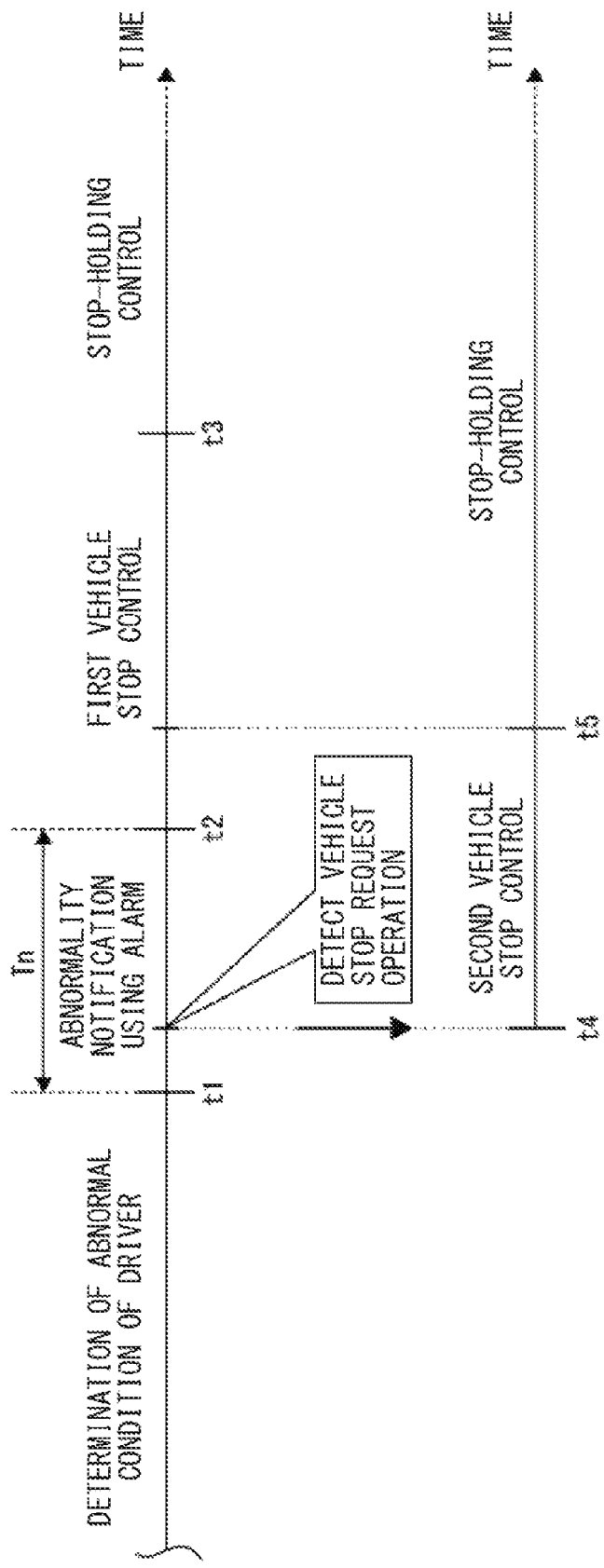
FIG. 3 is a diagram schematically illustrating exemplary automatic stop control of a vehicle according to one example embodiment of the technology.

In FIG. 3, time t2 may indicate a time point after the elapse of a predetermined period of time Tn from the start of the abnormality notification control.

When detecting no input data on a cancel operation within the predetermined period of time Tn after the start of the abnormality notification control, the vehicle control apparatus 1 may start first vehicle stop control at the time t2 to stop the vehicle from traveling. In the first vehicle stop control, the alarm may continue to be generated under the abnormality notification control. The predetermined period of time Tn may be set to any desired value, which may be 10 seconds, for example.

Herein, the term "cancel operation" refers to a predetermined operation to cancel the abnormality notification control. The cancel operation may be made by, for example, the driver recovered from the abnormal condition. In this case, the cancel operation may be a steering operation, for example. Note that the cancel operation should not be limited to the steering operation, and may be an operation of a predetermined operator inside the vehicle. Alternatively, the cancel operation may be performed by the passenger.

When the vehicle is stopped under the first vehicle stop control starting at the time t2, the vehicle control apparatus 1 may hold the vehicle in the stopped state by causing the EPB processor 8 to control the EPB-related actuator assembly 81. In FIG. 3, the vehicle may be stopped at time t3 under the first vehicle stop control.

Accordingly, even if the driver falls into an abnormal condition while the vehicle is traveling, it is possible to stop the vehicle safely.

According to the present example embodiment, the predetermined period of time Tn may be set between when the vehicle control apparatus 1 starts the abnormality notification control and when the vehicle control apparatus 1 performs the first vehicle stop control, expecting that the driver will recover from the abnormal condition, as described above.

In this case, the passenger needs to wait for the predetermined period of time Tn under the situation where the alarm continues to be issued until the start of the first vehicle stop control. Such a situation can unnecessarily fuel the anxiety of the passenger, making the passenger uncomfortable.

In some cases, it is apparent for the passenger seated in the front passenger seat that the driver will not recover from the abnormal condition soon. In such a case, the passenger can feel anxious while waiting inside the vehicle for the start of the first vehicle stop control.

According to the present example embodiment addressing such a concern, in a case where a vehicle stop request operation performed by the passenger is detected at a time point (e.g., time t4 in FIG. 3) within the predetermined period of time Tn after the start of the abnormal notification (alarm) at the time t1, the vehicle control apparatus 1 starts second vehicle stop control without waiting for the elapse of the predetermined period of time Tn. Herein, the term "vehicle stop request operation" refers to an operation requesting to stop the vehicle from traveling. The vehicle stop request operation may be inputted by the passenger using a predetermined operator of the EPB, for example.

In a case where the second vehicle stop control is executed without waiting for the elapse of the predetermined period of time Tn, the vehicle is stopped earlier (e.g., at a time t5 in FIG. 3), after the elapse of the predetermined period of time Tn, than in the case where the first vehicle stop control is executed after the elapse of the predetermined period of time Tn.

Note that the vehicle may be decelerated at a higher deceleration rate in the second vehicle stop control than in the first vehicle stop control. Thus, the vehicle is stopped at an earlier timing when the second vehicle stop control is performed in response to the detection of the vehicle stop request operation than when the first vehicle stop control is performed. This ensures the passenger to feel safe at an early timing.

Further, the vehicle control apparatus 1 may perform the notification control so that the output volume of the alarm is smaller while the vehicle is being decelerated under the second vehicle stop than in the predetermined period of time Tn. This helps prevent the alarm from unnecessarily fueling the anxiety of the passenger until the vehicle is stopped. Alternatively, the alarm may be muted while the vehicle is being decelerated under the second vehicle stop control.

When the vehicle is stopped at the time t5 under the second vehicle stop control starting at the time t4, the vehicle control apparatus 1 may hold the vehicle in the stopped state by causing the EPB processor 8 to control the EPB-related actuator assembly 81.

Accordingly, the vehicle control apparatus 1 of the present example embodiment makes it possible to perform appropriate vehicle stop control depending on the conditions of the driver while ensuring the passenger to feel comfortable.

An exemplary process performed by the drive assistance control processor 10 in the vehicle control apparatus 1 according to the present example embodiment will now be described with reference to FIG. 4.

Figure 4:
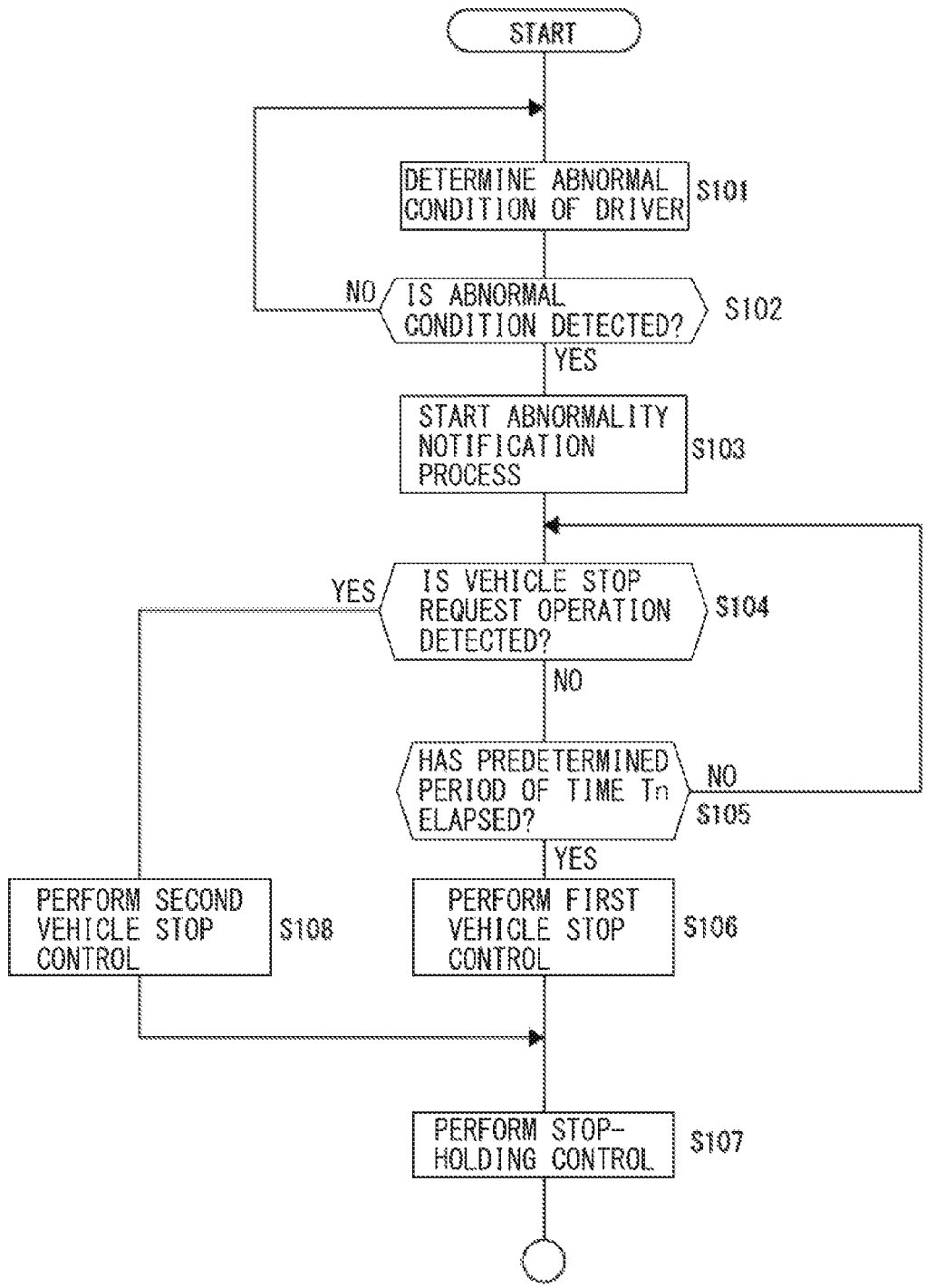
FIG. 4 is a flowchart of an exemplary process performed by the vehicle control apparatus according to one example embodiment of the technology.

The drive assistance control processor 10 may perform the process illustrated in FIG. 4 while the vehicle is traveling under the drive assistance control, such as autocruise control or steering assistance control. Alternatively, the drive assistance control processor 10 may perform the process illustrated in FIG. 4 while the vehicle is manually driven by the driver not under the drive assistance control.

First, in Step S101, the drive assistance control processor 10 may determine whether the driver is in the abnormal condition on the basis of detection data received from the internal environment sensor assembly 12 including the in-vehicle image sensor, the pulse sensor, the body temperature sensor, and so forth.

On the basis of the detection data received from a predetermined sensor in the internal environment sensor assembly 12, the drive assistance control processor 10 may determine that the driver is in the abnormal condition when detecting that the driver is putting on a suffering look or lying over the steering wheel through an image analysis of the acquired image data, or when detecting the pulse rate or the body temperature of the driver exceeding a predetermined normal range. The drive assistance control processor 10 may determine that the driver is in the abnormal condition also when detecting that the driver is groaning with pain or that the driver or passenger is asking for help through a voice analysis of the acquired sound data.

Further, the drive assistance control processor 10 may determine whether the driver is in the abnormal condition also on the basis of the steering wheel angle detected by the steering wheel angle sensor in the internal environment sensor assembly 12. For example, the drive assistance control processor 10 may determine that the driver is in the abnormal condition when the steering wheel angle detected by the steering wheel angle sensor has not been changed by a predetermined amount or greater for a predetermined time. When the steering wheel angle has not been changed by the predetermined amount or greater for the predetermined time, it may be assumed that the driver is taking his/her hands off the steering wheel because of being in an unconsciousness state or that the steering wheel is kept turned by the driver lying over the steering wheel.

Alternatively, when detecting that the steering wheel angles has been unchanged for the predetermined period of time, the drive assistance control processor 10 may perform confirmation notification control before determining that the driver is in the abnormal condition.

In the confirmation notification control, the drive assistance control processor 10 may cause the notification control processor 7 to make a notification to urge the driver to perform a steering operation. For example, the display unit 71 may display a notification to request the driver to perform a steering operation, and the sound output unit 72 may output a notification sound that urges the driver to perform a steering operation.

If the steering operation performed by the driver is detected within a predetermined period of time after the notification to urge the driver to perform the steering operation, the drive assistance control processor 10 may determine that the driver is not in the abnormal condition and end the confirmation notification control. In contrast, if the steering operation performed by the driver is not detected within the predetermined period of time after the notification to urge the driver to perform the steering operation, the drive assistance control processor 10 may determine that the driver is the abnormal condition and end the confirmation notification control.

The drive assistance control processor 10 may repeat Step S101 and Step S102 in order until the abnormal condition of the driver is detected in Step S102 on the basis of the result of determination in Step S101.

When detecting the abnormal condition of the driver in Step S102, the drive assistance control processor 10 may cause the process to proceed to Step S103. In Step S103, the drive assistance control processor 10 may start an abnormality notification process to issue a notification of the abnormal condition of the driver. The abnormality notification is aimed to facilitate the recovery of the driver from an unconscious state.

In the abnormality notification process, the drive assistance control processor 10 may cause the notification control processor 7 to control the display of an alarm message and the output of an alarm sound. For example, the notification control processor 7 may cause the display unit 71, which may be an MFD, for example, to display an alarm message, and the sound output unit 72 to output an alarm sound to inside the vehicle.

The drive assistance control processor 10 may increase the output volume of the alarm when determining that a passenger is seated in the rear passenger seat compared with when determining that a passenger is not seated in the rear passenger seat. The drive assistance control processor 10 may determine whether a passenger is seated in the rear passenger seat on the basis of the detection data received from the seating sensor, for example. Accordingly, the notification may be made with an alarm sound audible to the passenger seated in the rear passenger seat where the state of the driver is difficult to recognize.

The EPB processor 8 may cause the light processor 9 to control turning on/off the hazard indicator. Under the control of the light processor 9, the hazard indicator may be turned on while the abnormality notification process is being performed in the vehicle. This notifies a following vehicle or a pedestrian that the driver is in the abnormal condition.

Optionally, in the abnormality notification process, the drive assistance control processor 10 may wobble the vehicle by controlling the steering wheel angle and the acceleration/deceleration rate. This wobbling movement of the vehicle facilitates the recovery of the driver from an unconscious state.

Thereafter, the drive assistance control processor 10 may repeat Steps S104 and S105 in order until the vehicle stop request operation is detected in Step S104 or until the elapse of the predetermined period of time Tn is detected in Step S105 after the start of the abnormality notification process.

While Steps S104 and S105 are being executed, the vehicle may continue to travel under the drive assistance control. Note that, while the vehicle is being driven manually, the drive assistance control processor 10 may enable the drive assistance control when the abnormal condition of the driver is detected in Step S102.

Although not illustrated in FIG. 4, if the cancel operation is detected while Steps S104 and S105 are being executed, the drive assistance control processor 10 may end the abnormality notification process started at Step S103. The cancel operation may be, for example, a steering operation performed by the driver. The drive assistance control processor 10 may determine whether the cancel operation is performed on the basis of the amount of change in the steering wheel angle received from the steering wheel angle sensor, for example.

If the predetermined period of time Tn has been elapsed (Step S105: YES) without the vehicle stop request operation being detected in Step S104 (Step S104: NO), the drive assistance control processor 10 may cause the process to proceed from Step S105 to Step S106.

In Step S106, the drive assistance control processor 10 may perform the first vehicle stop control on the vehicle in the traveling state. For example, the drive assistance control processor 10 may perform the first vehicle stop control that decelerates the vehicle while disabling an accelerator operation.

In the first vehicle stop control, the drive assistance control processor 10 may cause the notification control processor 7 to output a sound, such as a horn sound. The horn sound may be outputted from the sound output unit 72 via a speaker to the outside of the vehicle under the control of the notification control processor 7. This allows a following vehicle or a pedestrian to recognize that the driver is in an abnormal condition and that the vehicle is going to make an urgent stop. Note that the abnormality notification process started at Step S103 may continue to be performed in the first vehicle stop control.

When the vehicle is stopped under the first vehicle stop control in Step S106, the drive assistance control processor 10 may cause the process to proceed to Step S107. In Step S107, the drive assistance control processor 10 may perform the control to hold the vehicle in the stopped state (hereinafter referred to as stop-holding control). The drive assistance control processor 10 may perform the stop-holding control by causing the EPB processor 8 to control the operations of the EPB-related actuator assembly 81.

After Step S107, the drive assistance control processor 10 may end the process illustrated in FIG. 4.

In contrast, if the vehicle stop request operation is detected within the predetermined period of time Tn after the abnormality notification control starts at Step S103 (Step S104: YES), the drive assistance control processor 10 may cause the process to proceed from Step S104 to Step S108.

In Step S108, the drive assistance control processor 10 may perform the second vehicle stop control on the vehicle in the traveling state. Note that the deceleration rate of the vehicle may be higher in the second vehicle stop control than in the first vehicle stop control.

The vehicle stop request operation may be an operation of a predetermined operator, for example. The predetermined operator may be a dedicated operator for the execution of the vehicle stop control or another operator such as an EPB operator. The vehicle stop request operation may be made by the passenger using the predetermined operator. The vehicle stop request operation may also be made by the driver.

The drive assistance control processor 10 may detect the vehicle stop request operation on the basis of an input signal corresponding to, for example, the operation of an EPB-related operator after the start of the abnormality notification process.

When detecting the vehicle stop request operation, the drive assistance control processor 10 may cause the process to proceed to Step S108. In Step S108, the drive assistance control processor 10 may perform the second vehicle stop control on the vehicle in the traveling state. In the second vehicle stop control, the drive assistance control processor 10 may decelerate the vehicle while disabling an accelerator operation. Further, the drive assistance control processor 10 may cause the notification control processor 7 to output a horn sound.

In the second vehicle stop control, the drive assistance control processor 10 may continue to perform the abnormality notification control started at Step S103. Note that the drive assistance control processor 10 may reduce the output volume of the alarm in the second vehicle stop control compared with in the predetermined period of time Tn.

The reason for this is as follows: In this example, the second vehicle stop control is performed in response to the vehicle stop request operation performed by the passenger. The passenger thus knows that the vehicle stop control is going to be performed. For such a passenger, a large alarm can be just an annoyance to make the passenger feel uncomfortable. Alternatively, the alarm may be muted while the vehicle is being decelerated under the second vehicle stop control.

When the vehicle is stopped under the second vehicle stop control in Step S108, the drive assistance control processor 10 may cause the process to proceed to Step S107. In Step S107, the drive assistance control processor 10 may perform the stop-holding control. For example, the drive assistance control processor 10 may hold the vehicle in the stopped state by causing the EPB processor 8 to control the operations of the EPB-related actuator assembly 81.

After Step S107, the drive assistance control processor 10 may end the process illustrated in FIG. 4.

If a steering operation performed by the driver is detected in the first vehicle stop control at Step S106 or the second vehicle stop control at Step S108, the drive assistance control processor 10 may determine that the driver has recovered from the abnormal condition, and end the first vehicle stop control or the second vehicle stop control. The steering operation required in this example may be a steering operation larger than that required to end the abnormality notification process.

The example embodiments are achieved through the above-described process performed by the drive assistance control processor 10.

The drive assistance control processor 10 in the vehicle control apparatus 1 according to the foregoing example embodiments of the technology includes the abnormality detection unit 10b, the notification control unit 10c, and the automatic stop control unit 10d. The abnormality detection unit 10b detects an abnormal condition of the driver while the vehicle is traveling. The notification control unit 10c performs the notification control to make a notification of the abnormal condition detected by the abnormality detection unit 10b. The automatic stop control unit 10d starts the first vehicle stop control of the own vehicle when detecting no operation to cancel the notification control within the predetermined period of time Tn after the notification control unit 10c starts the notification control. The automatic stop control unit 10d starts the second stop control of the own vehicle without waiting for the elapse of the predetermined period of time Tn when detecting the vehicle stop request operation performed by the passenger within the predetermined period of time Tn (refer to FIGS. 1, 2, and 4, for example).

Accordingly, the vehicle is stopped at an earlier timing on the basis of the passenger's decision in the second vehicle stop control performed in response to the detection of the abnormal condition of the driver than in the first vehicle stop control.

This helps prevent the passenger from waiting for the start of the vehicle stop control under the situation where the notification or alarm is issued. Accordingly, it is possible to perform appropriate vehicle stop control while ensuring the passenger to feel comfortable.

The notification control performed by the drive assistance control processor 10 according to at least one of the foregoing example embodiments may be output control of an alarm sound. The notification control unit 10c may reduce the output volume of the alarm in the second vehicle stop control compared with in the first vehicle stop control (refer to Step S108 in FIG. 4).

Accordingly, the notification control using the alarm is not performed more than necessary in a case where the passenger knows that the vehicle stop control is going to be performed.

This helps prevent the alarm from unnecessarily fueling anxiety of the passenger before the vehicle is stopped, making it possible to reduce the anxiety of the passenger.

The automatic stop control unit 10d in the drive assistance control processor 10 according to at least one of the foregoing example embodiments may stop the vehicle at a higher deceleration rate in the second vehicle stop control than in the first vehicle stop control (refer to Step S108 in FIG. 4).

This shortens the time from reflection of the passenger's decision to the stop of the vehicle.

Accordingly, it is possible to immediately stop the vehicle without fueling the anxiety of the passenger and to immediately ensure the safety of the passenger and the driver.

In at least one of the foregoing example embodiments, the vehicle stop request operation is an operation performed by the passenger using an operator of the EPB (refer to Step S104 in FIG. 4).

Accordingly, the operator for the EPB operation control may serve also as an operator for the vehicle stop request operation.

In this case, the EPB operator strongly associated with the image of stopping the vehicle may serve also as the operator for the vehicle stop request operation. This helps prevent the passenger from making the vehicle stop request operation in a wrong manner in an urgent situation where the driver falls into an abnormal condition.

Alternatively, an existing operator provided in the vehicle may be used as the operator for the vehicle stop request operation. In this case, there is no need to provide a dedicated operator for the vehicle stop request operation. This leads to a reduction in the number of components and a reduction in the number of steps in the manufacturing process.

For example, the EPB operator used to make the vehicle stop request operation may be provided on the center console portion so as to be easily operated by the passenger seated in the front or rear passenger seat. This allows the passenger to readily perform the vehicle stop request operation.

Alternatively, the operator used to make the vehicle stop request operation may be provided near the rear passenger seat. This allows the passenger seated in the rear passenger seat to readily make the vehicle stop request operation, which ensures the comfortability of the passenger seated in the rear passenger seat. In this case, an additional operator dedicated to the vehicle stop request operation may be provided near the rear passenger seat. Alternatively, an existing operator, such as a touch panel, provided on the rear passenger seat may serve also as the operator for the vehicle stop request operation.

In a case where an existing operator serves also as the operator for the vehicle stop request operation, the vehicle stop request operation may be inputted in a different way from an ordinary input way. For example, in a case where the EPB operator serves also as the operator for the vehicle stop request operation, the EPB function may be enabled by long-pressing the operator, while the vehicle stop request operation may be inputted by short-pressing the operator.

The notification control performed by the drive assistance control processor 10 according to at least one of the foregoing example embodiments of the technology may be output control of an alarm sound. The notification control unit 10c may increase the output volume of the alarm when determining that the passenger is seated in the rear passenger seat of the vehicle compared with when determining that the passenger is not seated in the rear passenger seat of the vehicle (refer to Step S103 in FIG. 4).

Accordingly, the notification may be made with the alarm sound audible to the passenger seated in the rear passenger seat where the state of the driver is difficult to recognize when the abnormal condition of the driver is detected.

This allows the passenger seated in the rear passenger seat to recognize that the driver is in the abnormal condition at an early timing. It is thus possible to mitigate the anxiety of the passenger generated when the first vehicle stop control is started after the elapse of the predetermined period of time Tn.

The drive assistance control processor 10 according to at least one of the foregoing example embodiments may decelerate the vehicle while Steps S104 and S105 are being repeatedly performed in order (i.e., until the vehicle stop control is started). This mitigates the anxiety of the passenger inside the vehicle generated when the driver falls into an abnormal condition while the vehicle is traveling.

The drive assistance control processor 10 according to at least one of the foregoing example embodiments may determine whether there is a passenger in the vehicle in the process illustrated in FIG. 4. In this case, Step S104 may be omitted when the drive assistance control processor 10 determines that there is no passenger in the vehicle.

The drive assistance control processor 10 may determine the presence of the passenger in the vehicle on the basis of the image data received from the in-vehicle imaging device in the internal environment sensor assembly 12 or the load data received from the seating sensor provided in the front or rear passenger seat.

If the drive assistance control processor 10 determines that there is no passenger in the vehicle, the drive assistance control processor 10 may skip Steps S104 and S105 and perform the first vehicle stop control in Step S106 without waiting for the elapse of the predetermined period of time Tn.

If there is no passenger in the vehicle, the drive assistance control processor 10 according to at least one of the foregoing example embodiments may decelerate the vehicle at a high deceleration rate in the first vehicle stop control performed at Step S106 in FIG. 4 as in the second vehicle stop control performed at Step S108. In this case, the drive assistance control processor 10 may determine the absence of the passenger in the vehicle on the basis of the image data received from the imaging device in the internal environment sensor assembly 12 or the load data received from the seating sensor.

Accordingly, it is possible to promptly ensure the safety of the driver in the abnormal condition by stopping the vehicle at an early timing.

If there is a passenger in the vehicle, the drive assistance control processor 10 according to at least one of the foregoing example embodiments may perform the second vehicle stop control in place of the first vehicle stop control at Step S106 in FIG. 4. Accordingly, it is possible to promptly ensure the safety of the passenger by stopping the vehicle at an early timing.

After the first vehicle stop control is performed at Step S106 in FIG. 4, the drive assistance control processor 10 according to at least one of the foregoing example embodiments may switch the first vehicle stop control to the second vehicle stop control in response to an operation performed by the passenger or the driver.

Some example embodiments of the technology are described in detail above with reference to the accompanying drawings. It should be appreciated that the example embodiments of the technology described above are mere examples and are not intended to limit the scope of the technology. All of the combinations of the configurations described herein are not necessarily required to solve the problem. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof. It is to be noted that the effects described herein are merely illustrative and not restrictive, and other effects may be present. Alternatively, some of the effects described herein may be achieved.

Figure 2:
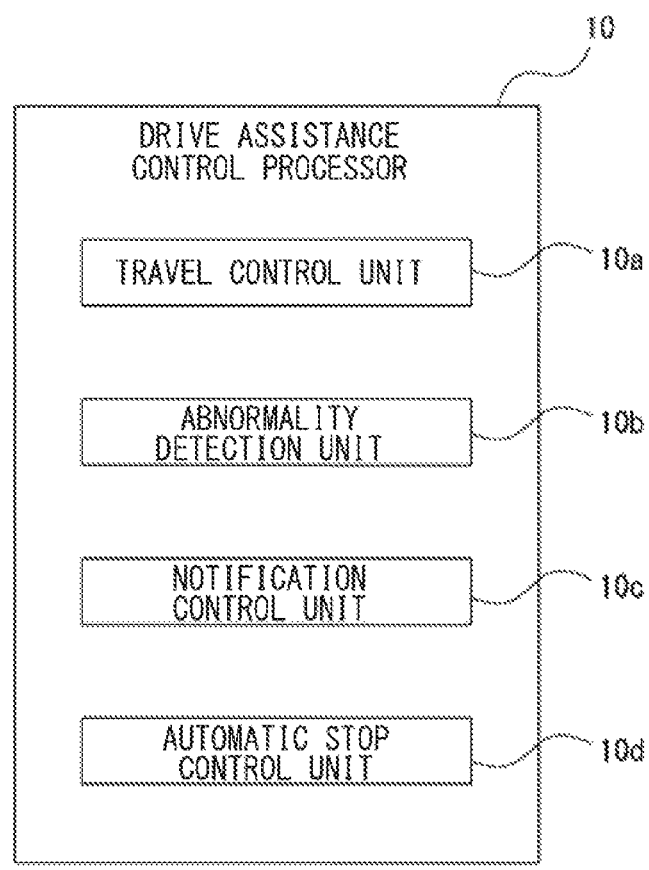
FIG. 2 is a block diagram illustrating an exemplary operational configuration of the vehicle control apparatus according to one example embodiment of the technology.

One or more of the abnormality detection unit 10b, the notification control unit 10c, and the automatic stop control unit 10d in the drive assistance control processor 10 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the abnormality detection unit 10b, the notification control unit 10c, and the automatic stop control unit 10d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the abnormality detection unit 10b, the notification control unit 10c, and the automatic stop control unit 10d in the drive assistance control processor 10 illustrated in FIG. 2.

The invention claimed is:

1. A vehicle control apparatus to be applied to a vehicle, the vehicle control apparatus comprising:
an abnormality detection unit configured to detect an abnormal condition of a driver who drives the vehicle while the vehicle is traveling;
a notification control unit configured to perform a notification control to make a notification of the abnormal condition detected by the abnormality detection unit; and
an automatic stop control unit configured to
start a first vehicle stop control of the vehicle when detecting no operation to cancel the notification control performed by a passenger in the vehicle within a predetermined period of time after the notification control unit starts the notification control,
start a second vehicle stop control of the vehicle without waiting for an elapse of the predetermined period of time when detecting a vehicle stop request operation performed by the passenger in the vehicle within the predetermined period of time, and
stop the vehicle from traveling when one or more of the first vehicle stop control and the second vehicle stop control is started.

2. The control apparatus according to claim 1, wherein the notification control comprises output control of an alarm sound, and
the notification control unit is configured to reduce an output volume of the alarm sound in the second vehicle stop control compared with in the first vehicle stop control.

3. The vehicle control apparatus according to claim 1, wherein
the automatic stop control unit is configured to stop the vehicle at a higher deceleration rate in the second vehicle stop control than in the first vehicle stop control.

4. The vehicle control apparatus according to claim 2, wherein
the automatic stop control unit is configured to stop the vehicle at a higher deceleration rate in the second vehicle stop control than in the first vehicle stop control.

5. The vehicle control apparatus according to claim 1, wherein
the vehicle stop request operation comprises an operation performed by the passenger using an operator of an electronic parking brake.

6. The vehicle control apparatus according to claim 2, wherein
the vehicle stop request operation comprises an operation performed by the passenger using an operator of an electronic parking brake.

7. The vehicle control apparatus according to claim 3, wherein
the vehicle stop request operation comprises an operation performed by the passenger using an operator of an electronic parking brake.

8. The vehicle control apparatus according to claim 4, wherein
the vehicle stop request operation comprises an operation performed by the passenger using an operator of an electronic parking brake.

9. The vehicle control apparatus according to claim 1, wherein
the notification control comprises output control of an alarm sound, and
the notification control unit is configured to increase an output volume of the alarm sound when determining that the passenger is seated in a rear passenger seat of the vehicle compared with when determining that the passenger is not seated in the rear passenger seat of the vehicle.

10. The vehicle control apparatus according to claim 2, wherein
the notification control comprises output control of an alarm sound, and
the notification control unit is configured to increase the output volume of the alarm sound when determining that the passenger is seated in a rear passenger seat of the vehicle compared with when determining that the passenger is not seated in the rear passenger seat of the vehicle.

11. The vehicle control apparatus according to claim 3, wherein
the notification control comprises output control of an alarm sound, and
the notification control unit is configured to increase an output volume of the alarm sound when determining that the passenger is seated in a rear passenger seat of the vehicle compared with when determining that the passenger is not seated in the rear passenger seat of the vehicle.

12. The vehicle control apparatus according to claim 4, wherein
the notification control comprises output control of an alarm sound, and
the notification control unit is configured to increase the output volume of the alarm sound when determining that the passenger is seated in a rear passenger seat of the vehicle compared with when determining that the passenger is not seated in the rear passenger seat of the vehicle.

13. The vehicle control apparatus according to claim 5, wherein
the notification control comprises output control of an alarm sound, and
the notification control unit is configured to increase an output volume of the alarm sound when determining that the passenger is seated in a rear passenger seat of the vehicle compared with when determining that the passenger is not seated in the rear passenger seat of the vehicle.

14. The vehicle control apparatus according to claim 6, wherein
the notification control comprises output control of an alarm sound, and
the notification control unit is configured to increase the output volume of the alarm sound when determining that the passenger is seated in a rear passenger seat of the vehicle compared with when determining that the passenger is not seated in the rear passenger seat of the vehicle.

15. The vehicle control apparatus according to claim 7, wherein
the notification control comprises output control of an alarm sound, and
the notification control unit is configured to increase an output volume of the alarm sound when determining that the passenger is seated in a rear passenger seat of the vehicle compared with when determining that the passenger is not seated in the rear passenger seat of the vehicle.

16. The vehicle control apparatus according to claim 8, wherein
the notification control comprises output control of an alarm sound, and
the notification control unit is configured to increase the output volume of the alarm sound when determining that the passenger is seated in a rear passenger seat of the vehicle compared with when determining that the passenger is not seated in the rear passenger seat of the vehicle.

17. A vehicle control apparatus to be applied to a vehicle, the vehicle control apparatus comprising
circuitry configured to
detect an abnormal condition of a driver who drives the vehicle while the vehicle is traveling,
perform a notification control to make a notification of the abnormal condition detected,
start a first vehicle stop control of the vehicle when detecting no operation to cancel the notification control performed by a passenger in the vehicle within a predetermined period of time after starting the notification control,
start a second vehicle stop control of the vehicle without waiting for an elapse of the predetermined period of time when detecting a vehicle stop request operation performed by the passenger in the vehicle within the predetermined period of time, and
stop the vehicle from traveling when one or more of the first vehicle stop control and the second vehicle stop control is started.

* * * * *